United States Patent
Czernichowski et al.

(10) Patent No.: US 7,459,594 B2
(45) Date of Patent: Dec. 2, 2008

(54) PLASMA-CATALYTIC CONVERSION OF CARBONACEOUS MATTERS

(75) Inventors: Albin Czernichowski, Orleans (FR); Krystyna Wesolowska, Orleans (FR); Jan Czernichowski, Orleans (FR)

(73) Assignee: Ceramatec, Inc., Salt Lake City, UT (US)

(*) Notice: Subject to any disclaimer, the term of this patent is extended or adjusted under 35 U.S.C. 154(b) by 241 days.

(21) Appl. No.: 11/167,572

(22) Filed: Jun. 27, 2005

(65) Prior Publication Data

US 2006/0018823 A1 Jan. 26, 2006

(30) Foreign Application Priority Data

Jun. 27, 2004 (FR) .................................. 04 07054

(51) Int. Cl.
*C07C 4/06* (2006.01)
(52) U.S. Cl. ..................................................... 585/539
(58) Field of Classification Search .................. 585/539
See application file for complete search history.

(56) References Cited

U.S. PATENT DOCUMENTS

| | | | |
|---|---|---|---|
| 3,622,493 A | 11/1971 | Crusco | |
| 5,069,987 A | 12/1991 | Gordon | |
| 5,340,664 A | 8/1994 | Hartvigsen | |
| 5,366,819 A | 11/1994 | Hartvigsen et al. | |
| 5,409,784 A | 4/1995 | Bromberg et al. | |
| 5,425,332 A | 6/1995 | Rabinovich et al. | |
| 5,763,114 A | 6/1998 | Khandkar et al. | |
| 5,993,761 A | 11/1999 | Czernichowski et al. | |
| 6,007,742 A | 12/1999 | Czernichowski et al. | |
| 6,153,852 A | 11/2000 | Blutke et al. | |
| 6,185,341 B1 | 2/2001 | Ishida et al. | |
| 6,245,309 B1 | 6/2001 | Etievant et al. | |
| 6,436,354 B1 | 8/2002 | Priegnitz et al. | |
| 6,606,855 B1 | 8/2003 | Kong et al. | |
| 6,924,608 B2 | 8/2005 | Czernichowski et al. | |
| 2004/0216378 A1 | 11/2004 | Smaling | |
| 2005/0269978 A1 | 12/2005 | Czernichowski et al. | |
| 2006/0018823 A1 | 1/2006 | Czernichowski et al. | |
| 2007/0259228 A1 | 11/2007 | Hartvigsen et al. | |

FOREIGN PATENT DOCUMENTS

| FR | 0407054 | 6/2004 |
|---|---|---|
| WO | WO-9830524 | 7/1998 |
| WO | WO-9919456 | 4/1999 |

OTHER PUBLICATIONS

U.S. Appl. No. 60/798,863, filed May 8, 2006, Hartvigsen et al.
Ridley, Basia "International Search Report", (Jan. 5, 2007),1-2.
Ridley, Basia "Written Opinion of the International Searching Authority", (Jan. 5, 2007),1-3.
Copenheaver, B. International Search Report for PCT/US07/11039 sent Feb. 6, 2008, 1-2.
Copenheaver, B. Written Opinion for PCT/US07/11039 sent Feb. 6, 2008, 1-7.
Czernichowski, A. "Glidarc Assisted Preparation of the Synthesis Gas from Natural and Waste Hydrocarbons Gases", *Oil & Gas Science and Technology—Rev. IFP*, vol. 56, No. 2, (2001), 181-198.
Wisegeek (Author Unknown), "What is a Plasma Cutter?", (c) 2006, retrieved from the internet on Nov. 21, 2007, (Apr. 27, 2006), 1-2. Available at http://web.archive.org/web/20060427222537/http://www.wisegeek.com/what-is-a-plasma-cutter.htm.

*Primary Examiner*—Taofiq A Solola
(74) *Attorney, Agent, or Firm*—David Fonda

(57) ABSTRACT

The process and the device of assistance by electric discharge plasma for a partial oxidation of various liquids or gas, has for object the gas rich production of CO and H2 (syngas) can contain the CH4 and C2H4 also, this without soot formation. Carbonaceous matters considered here are fossil origin (as the diesel oil, gas, the kerosene, the naphtha, the heavy oil, the natural gas, etc.) or renewable (as the rape oil, the ethanol, the glycerol, the biooil, the molasses, the biogas, etc.).

Products conversion is obtained in a device by electric discharge plasma GlidArc-I, installed in a superior compartment of the device and communicating directly with its full lower compartment by a refractory porous containing oxides of nickel. The GlidArc-I first of all serves to light the electro-reinforced total combustion of a flux reduce a carbonaceous (fuel) mixed with a gas combustive base of oxygen (for example air). This combustion warms the then catalytic refractory of post-plasma until a favourable temperature is obtain to the partial catalytic oxidization of fuel toward the syngas or the mixed syngas with methane and the ethylene (reformats). Finally, these discharges maintain and consolidate this partial oxidization without production of soot and with a total conversion of fuel. The power dissipated in the GlidArc-I is negligible (2% to the maximum) in relation to the power thermal lower reach by the flux of the syngas or of reformats it thus products.

5 Claims, 3 Drawing Sheets

PLASMA-CATALYTIC CONVERSION OF CARBONACEOUS MATTERS

CROSS-REFERENCE TO RELATED APPLICATIONS

This application is a continuation-in-part of French patent application Ser. No. 04 07054, filed Jun. 26, 2004, which is incorporated herein by reference.

This application is a continuation of French patent application Ser. No. 04 07054, filed Jun. 26, 2004, which is incorporated herein by reference.

TECHNICAL FIELD

The present invention relates to a process and a plasma-catalytic device of converting various carbon containing liquid or gas matter in the presence of added oxygen ($O_2$).

SUMMARY OF THE INVENTION

The process and the device of assistance by electric discharge plasma for a partial oxidization of various liquids or gas, has for object the gas rich production of CO and H2 (syngas) can contain the CH4 and C2H4 also, this without soot formation. Carbonaceous matters considered here are fossil origin (as the diesel oil, gas, the kerosene, the naphtha, the heavy oil, the natural gas, etc.) or renewable (as the rape oil, the ethanol, the glycerol, the biooil, the molasses, the biogas, etc.).

Products conversion is obtained in a device by electric discharge plasma GlidArc-I, installed in a superior compartment of the device and communicating directly with its lower compartment filled by a refractory porous containing oxides of nickel. The GlidArc-I first of all serves to light the electro-reinforced total combustion of a flux reduce a carbonaceous (fuel) mixed with a gas combustive base of oxygen (for example air). This combustion warms the then catalytic refractory of post-plasma until a favourable temperature is obtained to the partial catalytic oxidation of fuel toward the syngas or the mixed syngas with methane and the ethylene (reformates). Finally, these discharges maintain and consolidate this partial oxidization without production of soot and with a total conversion of fuel. The power dissipated in the GlidArc-I is negligible (2% to the maximum) in relation to the power thermal lower reach by the flux of the syngas or of reformats it thus products.

DETAILED DESCRIPTION OF THE PREFERRED EMBODIMENTS

The present invention relates to a process and a plasma-catalytic device of converting various carbon containing liquid or gas matter in the presence of added oxygen ($O_2$). According to this process, matter is converted mainly to a gaseous mixture of hydrogen $H_2$, carbon monoxide CO, carbon dioxide $CO_2$ and steam $H_2O$, accompanied by light gaseous hydrocarbons. These gases may be diluted with nitrogen N2 if air is used as the source of oxygen. Such mixtures are referred to as reformate in general and synthesis gas or "syngas" when the content of hydrocarbons is limited.

Figure 1:
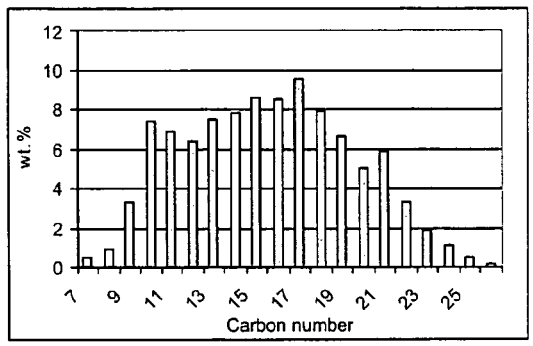
FIG. 1 is a graph depicting the composition of commercial Diesel fuel.

The process is illustrated first by the conversion of a hydrocarbon mixture such as commercial Diesel fuel (diesel oil) which is derived from fossil matter. The composition of this liquid is indicated in FIG. 1; it contains hydrocarbons C7 to C27 (a weighted average of C15.6 with a simplified chemical formula of $CH_{1.83}$) of the paraffin, olefin and aromatic types. Its relative density is 0.826 and contains 310 ppm sulfur. Another example is given for converting heavy naphtha. These two liquids represent a class of liquid fuels from fossil source such as gasoline, kerosene, heavy oil and even extra heavy oil.

The rape oil conversion illustrates that the process is applicable to renewable carbon compounds containing the oxygen in its molecular structure. This example represents a class of liquids derived from the biomass (generally known as "renewable source") such as ethyl alcohol either concentrated or diluted with water, pyrolysis flash oil from biomass (which often is called the "bio oil", containing up to 40% of water), molasses (which also contains water), concentrated glycerol or glycerol diluted with water, etc.

Finally, the conversion of natural gas, composed mainly of methane $CH_4$ and lesser quantities of ethane $C_2H_6$, propane $C_3H_8$ and butanes $C_4H_{10}$, illustrates the process to the gases of natural or industrial origin, of fossil or renewable, such as the propane or butane (called LPG), of oil well associated gases, of flare gases, of pyrolysis gases from fossil or renewable matter (such a gas sometimes containing steam), coal seam methane (firedamp of mines), or dry or humid biogases, etc.

The production of syngas from saturated light hydrocarbons (paraffins) was the object of an earlier French patent, see A. CZERNICHOWSKI, P. CZERNICHOWSKI, "Assistance électrique d'oxydation partielle d'hydrocarbure légers par l'oxygène ", No. 97.10989, (2 768 424). The present invention widens the types of carbonaceous matters that can be converted, bringing some substantial improvements: notably a reduction in the specific electric power to assist the conversion, the use of catalytic refractory substances in a post-plasma zone, and most effective starting and stopping modes of the device.

The production of syngas is a very important process in the use of the natural gas, cf. the patent previously quoted. Besides, in recent years there is a growing interest in the production of syngas or reformate from liquid fuels of fossil or renewable origins, as a feed to a fuel cell. For fuel cells that operate at low temperatures, one considers the syngas as a source from which pure hydrogen may be extracted, while fuel cells operating at high temperatures, such as the "Solid Oxide Fuel Cell" (SOFC) or the "Molten Carbonate Fuel Cell" (MCFC), accept syngas or reformate directly as fuel. These types of fuel cells are of immediate interest for this invention.

Process and Plasma-Catalytic Device

Figure 2:
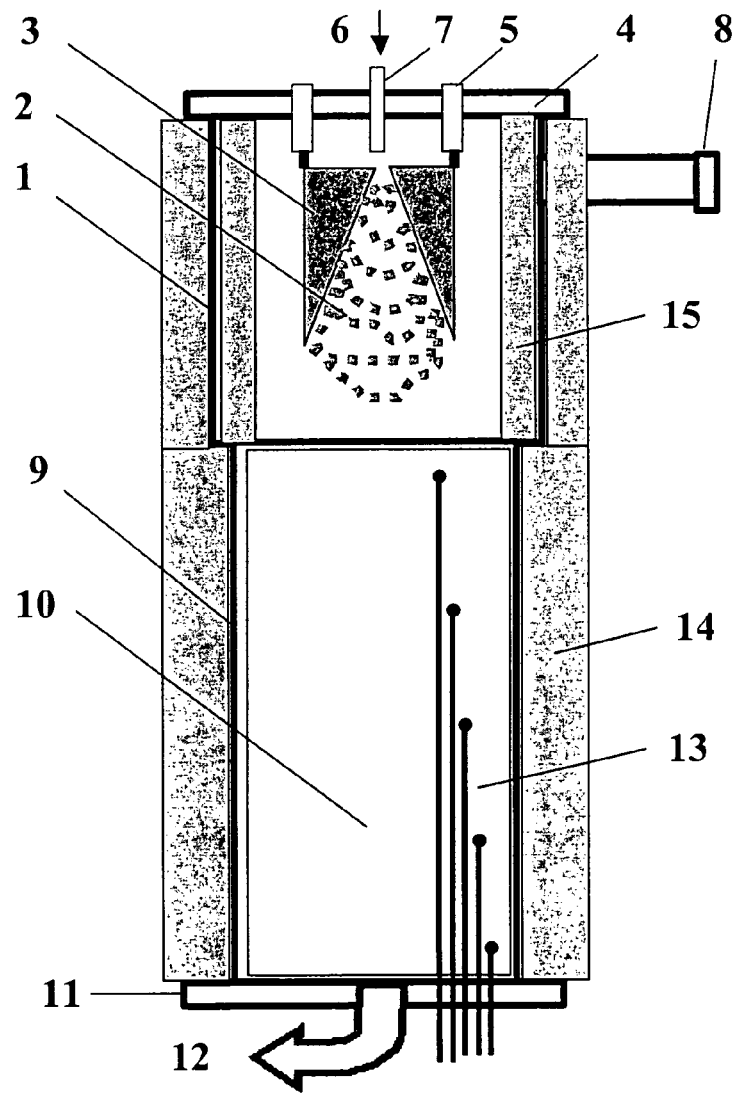
FIG. 2 is a simplified schematic of a device in accordance with the present invention.

The plasma-catalytic process is achieved in our device (called "reactor" or "reformer"), the process and the device being object of the present invention. The device is presented schematically in FIG. 2. This diagram illustrates an example of the invention but is not restricted in its use with modifications as an industrial reactor. The device is composed of a compartment (zone) 1 to generate plasma by gliding electric discharges 2, produced between two metallic divergent electrodes 3 having the shape of a knife or a dagger. This type of discharge is already known under name of "GlidArc-I". Electrodes are connected to a high voltage source (typically 10 kV, 50-60 Hz or suitable line frequency), producing a limited current (typically <0.2 A). The electric power in plasma may be measured by a wattmeter. Electrodes 3 are attached to a top lid 4 by means of insulators 5. A mixture of reagents 6 to convert is introduced by the tube 7 disposed symmetrically in relation to electrodes 3, the latter being placed in the plasma compartment 1. Reagents are composed of carbonaceous matter that needs to be converted (called "fuel") and air, oxygen enriched air or technical quality oxygen (these oxidizers called "oxidants"). Reagents can contain steam added to the oxidant or already present in an oxidizing gas, or some water added or initially present in a fuel. Gas flows are controlled by a mass flow meter, while the liquids are fed using a metering pump. Carbon matter is possibly preheated and can be pre-mixed with oxidizing gas for this operation. Reagents are injected in zone 1 of the reactor by the tube 7. The reagents jet pushes the electric discharge 2 starting initially between the nearest points of electrodes 3, provoking a fast displacement of this discharge along the jet. This discharge glides quickly along the electrodes and detaches when the electrode separation (that increases progressively) becomes too great in relation to the voltage delivered by the electric source. A new discharge then starts and follows the path of the previous discharge.

The description of these gliding discharges has been given in details in the patent cited above. The successive discharges form an "electric flame" 2 in presence of an oxidant alone. One can observe this by incorporating a view-port in the reactor 8. This flame becomes a real thermal flame 2 electro-reinforced in presence of a mixture of a fuel and an oxidant, and the flame being ignited and maintained by the GlidArc-I. The second zone 9 called "post-plasma" is located downstream the plasma zone 1, which is filled with a refractory solid 10 granular shape or any other packing shape, allowing the outgoing gas flow of the plasma zone 1 to readily flow through this post-plasma zone.

The refractory chosen is characterized by its porous structure and by having a point of fusion (melting or sintering) above 1250° C. The two zones communicate directly (no separation so that the extremity of the GlidArc-I's discharge is near (or in contact) with the top layer of refractory granules (or of other catalytic refractory filling). The outside metallic body of zones 1 and 9 is connected to an electrical earth ground potential for safety reasons. The post-plasma zone is covered by a lower lid 11 which is located near the exit 12 of products of the conversion. Several thermocouples 13 are inserted in the filling of post-plasma zone. The two zones of the reformer are thermally isolated 14 from environment. Besides, the thermal isolation of the zone of GlidArc-I is reinforced from the inside 15. Finally, no part of the reactor is forced cooled.

Chemical analyses of the outgoing gas (syngas or reformate) may be done by gas chromatography (GC). We used a μ-GC with two channels, one channel dedicated to the $H_2$, $O_2$, $N_2$, $CH_4$ and CO and the other to $CO_2$, $C_2H_4$, $C_2H_6$, $C_2H_2$, $C_3H_6+C_3H_8$ and $H_2O$ (humidity). The steam flow in products is calculated from mass balance. A complete analysis of gas only takes 255 seconds.

The two compartments 1 and 9 are therefore connected in series in relation to the flow of reactants and products. The first phase of the partial oxidation conversion of carbon matter having a chemical average formula $C_pH_qO_r$ (r=0 for hydrocarbons), starts in the active plasma zone and ends on the first layer of the filling in the post-plasma zone, this filling being with the shape of a granular matter allowing passage of the flow of reactive products through it. Besides, whatever is the shape or the filling technique—it must always allow passage of the flow of reactants and products in contact with all the mass.

The advancement of this conversion phase can be described in a simplified way as a fraction f of total combustion of a carbon load $$fC_pH_qO_r + [f(p+q/4) - r/2]O_2 = fp\,CO_2 + fq/2\,H_2O. \quad (1)$$

This reaction is greatly exothermic and the heat dissipated in the zone 1 which is thermally isolated generates the rapid warming up of this zone as well as the warming up of the top layer of the filling (granules); this temperature then can reach 1200° C. The part of carbon matter that is not consumed in these conditions pyrolyzes, producing mainly $H_2$, CO, methane $CH_4$, ethylene $C_2H_4$, acetylene $C_2H_2$ and elementary solid carbon C.

The gas flux containing products of the pyrolysis mixed with products of reaction (1) then cross the successive layers of the filling where the endothermic reactions take place that transform reagents successively to syngas mainly, or some reformates:

$$CO_2 + CH_4 = 2\,CO + 2\,H_2 \quad (2)$$

$$2\,CO_2 + C_2H_4 = 4\,CO + 2\,H_2 \quad (3)$$

$$2\,CO_2 + C_2H_2 = 2\,CO + H_2 \quad (4)$$

$$CO_2 + C = 2\,CO \quad (5)$$

$$H_2O + CH_4 = CO + 3\,H_2 \quad (6)$$

$$2\,H_2O + C_2H_4 = 2\,CO + 4\,H_2 \quad (7)$$

$$2\,H_2O + C_2H_2 = 2\,CO + 3\,H_2 \quad (8)$$

$$H_2O + C = H_2 + CO \quad (9)$$

The reactions that consume heat (endothermic) provoke a progressive lowering of the temperature of the gas stream (and of the successive layers of the filling crossed by the fluid), slowing down the progression of reactions (2) to (9). The heterogeneous reactions (5) and (9) are especially slow. In the case of natural gas reformation in the referenced patent, formation of solid carbon is not a problem, even if a loose packing of metallic sticks are used. The quantity of soot was minimal by virtue the refractory nature of methane against pyrolysis. However, in the case of liquid carbonaceous matter presented here, their pyrolysis toward the soot is especially strong and intolerable for the targeted applications, such as the feeding of fuel cells like SOFC and MCFC.

We tried to replace these sticks by nickel wire to increase the surface of contact between the solid matter and the gaseous fluid initially. However, at the time of the starting of the reactor the top layer was then exposed to too high a temperature of the plasma jet. Indeed, the thermal conduction of these wires was not sufficient to drive the heat toward the deeper layers of such an arrangement. The wire deformed dramatically. An inert refractory granular matter such as alumina, silica or zirconia was unsatisfactory because soot was always present in products, and it relatively quickly blocked all the post-plasma zone and therefore obstructing flow through the reactor.

We finally found the solution to this problem: it consists in dispersing nickel on inner and outer surfaces of a porous granular matter capable of handling high temperatures. We used the "chamotte" (a natural aluminosilicate cooked to high temperature, of beige color with stains indicating the presence of other oxides) but other granulates (or other shapes) of refractory can be also used. The utilization of a solid matter filling the post-plasma zone, to facilitate contact between the ionized species and excited radicals exiting the active zone of plasma has been evoked in the previous patent but the nature of this filling was not catalytic and very insufficient for light hydrocarbon conversions.

The preparation of the catalytic filling of zone post-plasma is described here, as an example, for the case of granules.

These are activated the following way: granules of a chamotte, of size between 5 and 10 mm, are soaked for 10 to 30 minutes in a boiling concentrated solution of nickel nitrate (no precious metal is added). The filled granules are then dried and are calcined in an oxidant atmosphere (air) in the oven until they become black (the color of certain oxides of nickel), after the decomposition of the nickel nitrate and its transformation to finely dispersed oxides of nickel. Other soluble compounds of nickel (chloride, sulfate, acetate, etc.) were also successfully used to infiltrate the granules and to char them The prepared granules (pre-activated) are then filled into the post-plasma zone of the reactor. During the first use, these granules will become active by the following mechanism: at the time of the starting of the cold reactor filled with granules is heated inside (especially the first layer of the zone 9) until the temperature is between 600° and 1000° C. (according to the composition of the carbon matter that needs to be converted) while using the gliding discharges of the GlidArc-I to ignite and maintain the complete combustion flame (1) of carbon matter. The post-plasma compartment 9 filled with the pre-activated granules is then in a flowing stream of combustion products containing an excess of oxygen. In these conditions, all nickel (whatever its initial shape or chemical state) on the surface of and inside the granules become oxidized completely. One knows oxides of nickel mainly of NiO, $Ni_2O_3$ and $Ni_3O_4$ (otherwise $NiONi_2O_3$) that change one toward the other according to the temperature and the oxygen activity. It is exactly this property that we use judiciously for our plasma-catalytic process of partial oxidation of carbon matter, the object of the present innovative application.

When the temperature of the top layer of granules (measured for example with the help of one of thermocouples used 13) reaches 600 to 1000° C., we increase the flow rate of carbon matter to convert (fuel) and/or we decrease the flow of oxidant gas, for example air, while observing a small diffusion flame (in air) of a small side stream taken from the product gas 12. During the starting phase, the outgoing gas is not flammable.

Following the adjustment of flow rates to achieve a fuel rich mixture, such that the atomic ratio of oxygen to carbon ra=O/C becomes near to 1, the flame will have the characteristics of one of the following cases:

A difficult flame to maintain when ra>1.7 or when the flammable products are diluted strongly in a neutral gas matrix as nitrogen, steam and/or carbon dioxide.

A flame hardly visible by eyes but steady when ra ~1.3 to 1.7. This is the ideal case for the process presented here, indicating that the outgoing gas is composed mainly of $H_2$ and CO with only traces of other flammable compounds (one calls such a mixture "syngas").

A blue steady flame presenting a faint yellow border when ra ~1.0-1.3. This is an acceptable case for our process when the outgoing gas composed mainly of $H_2$ and CO also contains significant quantities of other flammable components as $CH_4$ or $C_2H_4$; one calls such a mixture a reformate.

A steady flame of yellow color when ra<<1.0. This is a dangerous case for our process because it is generally accompanied by soot deposition in the post-plasma zone. The product gas then contains easily detectable quantities of acetylene that confirms this danger. The value of ra must be increased until the flame of control becomes acceptable.

The processes of total conversion (100%) of carbon load (no trace of solid carbon at the exit of the reformer) toward syngas or reformate are explained by the following mechanism: oxides of nickel (NiOx global formula) initially present on and in the pores of the granules filling the post-plasma zone, react with certain products of oxidation and pyrolysis created in the plasma zone. We can distinguish two cases:

these oxides increase their state of oxidization, for example:

$$2\ NiO + H_2O = Ni_2O_3 + H_2, \quad (10)$$

$$2\ NiO + CO_2 = Ni_2O_3 + CO, \quad (11)$$

or decrease it, for example:

$$2\ Ni_2O_3 + C_2H_4 = 4\ NiO + 2\ CO + 2\ H_2, \quad (12)$$

$$2\ NiO + C_2H_2 = 2\ Ni + 2\ CO + H_2. \quad (13)$$

depending on the location, temperature and oxygen activity where these oxides of nickel are present in the post-plasma zone. Indeed, thermocouples 13 inserted in the zone 9 indicate a strong negative gradient of temperatures through the post-plasma zone bed. This fall of temperature is not the result of insufficient thermal insulation of the zone but is rather due to the endothermic reactions (2) to (9) and those of the type (10) to (13). The distribution of temperatures stabilizes after an initial startup transient to an operating steady state. The GlidArc-I must remain in operation to maintain the steady state, otherwise one observes a progressive displacement of the normal temperature toward the exit 12 of the reactor, which initiates a cooling of the first layers of the bed which in a short time causes thermo-catalytic deactivation. If the GlidArc is turned off, a deposit of soot inevitably is deposited in the filling, which in a short time stops the process.

We must maintain the filling therefore to a sufficiently high temperature to maintain the process needed for consumption of the carbon formed at by pyrolysis of a portion of the carbon load within the plasma zone:

$$C + NiO_x \rightarrow CO\ (or\ CO_2) + NiO_{x-\epsilon} \quad (14)$$

where $\epsilon$ takes a value >0 and $\leq x$. This very efficient process happens to the surface of contact between the soot and oxides of nickel, thanks to migration property of $O^{2-}$ in the structure of oxides when taken to a high temperature. As the NiOx sub-oxide is formed then an inverse process of oxidization of the following types occur:

$$NiO_{x-\epsilon} + \epsilon H_2O = \epsilon H_2 + NiO_x\ or \quad (15)$$

$$NiO_{x-\epsilon} + \epsilon CO_2 = \epsilon CO + NiO_x. \quad (16)$$

They are thus indeed the new catalytic processes of a heterogeneous conversion of the soot, like the one of reactions (5) and (9). The oxide of nickel, put down on rings of alumina filled with 10 to 16% (mass percentage) of Ni is well known as a catalyst of methane steam reforming (6) into synthesis gas at 800-900° C. and to 3.3 MPa. Nevertheless we don't have information concerning its use for a process of partial oxidization of a carbon matter heavier and more complex, at atmospheric pressure.

EXPERIMENTAL RESULTS

Example A

Reforming of diesel oil is a very difficult process. The characteristic of fuel used was given previously in the present description. The reactor used is schematically drawn in FIG. 2. The body of the reactor is made of stainless steel. The external diameter of the zone 1 GlidArc-I is 110 mm while the one of the post-plasma zone 9 is 90 mm. Lengths of the two zones respectively are 15.5 cm and 75 cm. Six electrodes 3 disposed symmetrically of 60° of angular distance around the injection tube 7 (instead of two electrodes of the FIG. 2) are powered by a six phase high voltage system. A cylindrical insert of steel of interior diameter of 53 mm post-plasma zone (length of 75 cm) is placed; the volume of this zone is therefore 1.6 liters. The space between the insert and the outside cylinder is filled with sand, creating a thermal barrier. Additionally, a ceramic fiber insulation blanket isolates this zone from the outside. The plasma zone is also isolated thermally inside and outside.

Atmospheric air is used as oxidizer to a constant flow of 50 L(n)/min, controlled by a mass flow meter. A gear pump sends the Diesel fuel toward a mixing tee connector after passing through a rotameter to control the flow rate. The absolute flow (in g/min) is measured frequently from the difference in mass of the liquid aspirated by the pump. The range of flows explored is 0.65-1.0 Liter per hour. Air and fuel are mixed in this tee fitting and the mixture is then sent toward a stainless steel coil heated by an electric current of adjustable intensity. We maintain the temperature of exit of the mixture then to about 200° C. The thus preheated mixture is injected then by the tube 7 of interior diameter of 4 mms directly in the reformer.

Eleven type K thermocouples 13 measure temperatures in the different points of the device. We especially observe points T6, T7, T8, T9 and T10 of post-plasma zone, situated respectively at 7.5, 15, 30, 45 and 60 cm underneath the top layer of the filling 10 (all the length of this zone is filled by chamotte's granules) while counting from the top extremity of the filling.

Granules of non-infiltrated chamotte 5 to 10 mms are first used to see the difference between the activated and not activated filling. We took a proportion of 9.6 g/min of fuel for 50 L(n)/min of air corresponding to ra=O/C=1.35. Operation of the reactor was stopped at the end of 4 hours following a strong rise in pressure inside the reactor. After cooling (under nitrogen) and the dismantling of the reactor, we found soot settled down on these raw granules. The deposit of soot was especially massive between 25 and 70 centimeters from the top of filling 10. This test showed that the inert filling granules didn't catalyze (or insufficiently catalyzed) the conversion of soot into useful products such as $H_2$ or the CO.

Example B

Figure 3:
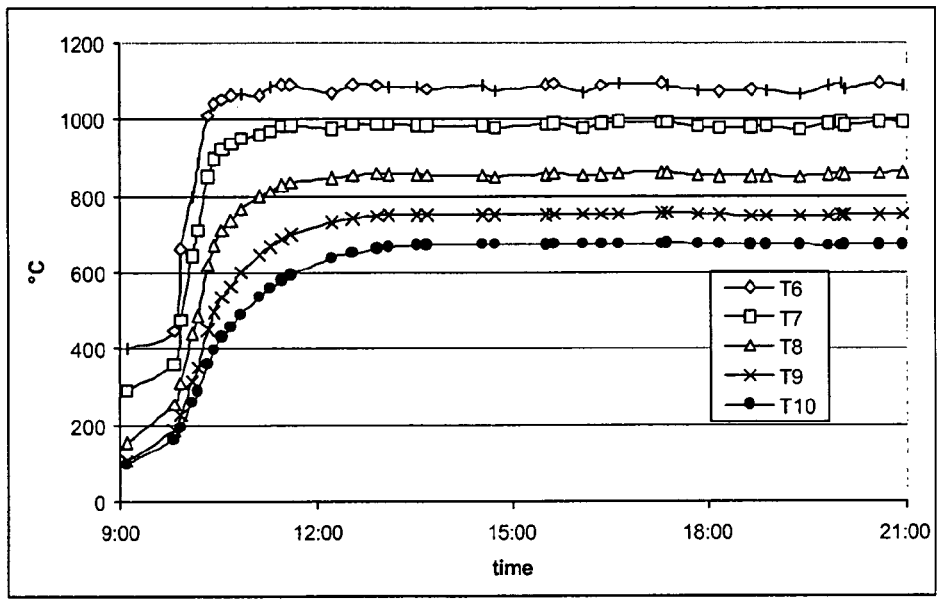
FIG. 3 is a graph depicting temperature rise over time.

The following test was conducted using nearly identical conditions to those of the example A. The only difference concerns the nature of granules; this time they were activated by infiltration of nickel as described previously. For the same 9.5 g/min of fuel and 50 L(n)/min of air (ra=1,36) we operated for 12 hours, without difficulty and without progressive rise in pressure inside the reactor. The test was ended voluntarily. After the cooling (under nitrogen) and dismantling of the reactor, no soot was found on the active granules or on other parts of the reactor. The FIG. 3 presents the temperature rise during this test. A strong gradient of temperature through the post-plasma zone indicates an endothermic reaction taking place quickly in the top layer 10 of the activated granules. The exit gas analysis from the reactor confirms this visual observation (no soot or tar put down on a ceramic wool exposed to the flux of the exit gas) and chemical analysis. The syngas had the following composition (% on dry basis): $H_2$=13.8, CO=18.6, $CO_2$=4.5, $CH_4$=2.1, $C_2H_4$=0.3, $C_2H_6$=0.004, C2H2, C3 and O2-absent, the remainder being $N_2$ and Ar. Methane is present in reformate from liquids carbon fuel because it is the hardest molecule to crack or to reform. It appears at the time of pyrolysis, methane is synthesized in the cooler lower portion of the bed by the methanation reaction $$CO + 3 H_2 = CH_4 + H_2O. \tag{17}$$

The product gas from the device possesses a lower heating value of 5.1 kW for an electric discharges power equal to 0.9 kW. This last value is high because we used six electrodes 3 of the GlidArc-I, all powered.

In examples that follow, we will show that two electrodes are sufficient, which means a reduction in the value of electric power assistance, then equivalent to 1 or 2% of the heating value of the syngas (or of reformates).

Example C

The same Diesel fuel is reformed in another B reactor of the interior diameter the post-plasma zone 9 of 82 mm and length of 22 cm only (volume of this zone then equal to 1.2 L). The zone 1 of GlidArc-I between two electrodes 3 has the similar interior diameter and the length of 12.5 cm (the volume of this zone is then 0.6 L). The interior diameter of the injection tube 7 vaporizing mixture+air is 8 mm; we don't use any nozzle or spraying to disperse fuel in air. On the contrary, we sometimes see by the port-hole 8 fuel droplets that don't affect our electric discharge 2.

We did several tests data in/out are the following:

| | |
|---|---|
| Flow of the compressed air | 48-146 L(n)/min |
| Diesel oil flow | 11-30 g/min |
| Preheating Temperature of mixture diesel oil + air | 140-200° C. |
| GlidArc-I electric power | 310 W |
| Absolute pressure | 1.1 bar |

Analysis of outgoing reformate (dry basis):

| | |
|---|---|
| $H_2$ | 16-20% vol. |
| CO | 19-22 |
| $H_2$ + CO | 38-41 |
| $CO_2$ | 2.4-4.8 |
| $CH_4$ | 0.8-3.3 |
| $C_2H_4$ | 0.0-2.1 |
| $N_2$ + Ar | 52-58 |
| $C_2H_2$, $C_3$, $O_2$ | absent |
| $H_2S$ | detected with the help of a specific reagent |

-continued

| Power (PCI) of outgoing reformats | 7-22 kW. |

Figure 4:
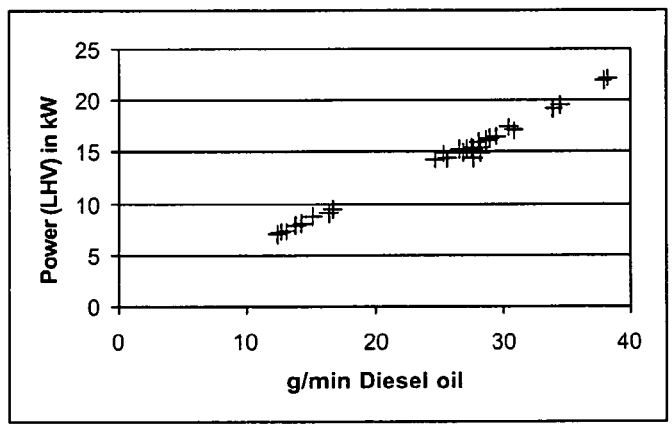
FIG. 4 is a graph depicting the heating value of a reformulate, and its products according to the fuel flow entering.
Figure 5:
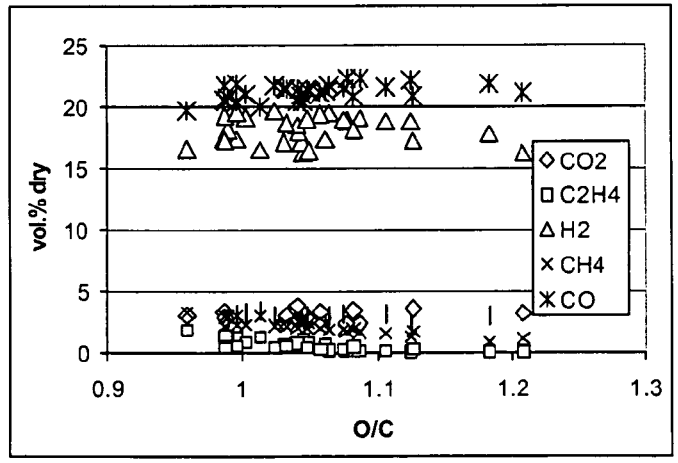
FIG. 5 is a graph depicting the composition of dry reformate according to the ra; and, FIG. 6 is a graph depicting component concentration in the outgoing gas, to the proportion of the air/oil, of a device in accordance with the present invention.

The FIG. 4 represent the heating value of reformate, and its products according to the fuel flow entering. We note that is very easy to modify the quantity (and the power) of exit reformate by changing the flow of the fuel entering and associating to this flow a suitable flux of air to maintain the O/C atom ratio (ra) around the value 1.0. This change of the thermal power of the device can be made in less than one minute. The composition of dry reformate according to the ra is presented on the FIG. 5 for all our reforming tests done in the same day. A point's dispersion is due by the lack of the thermal balance of the device that requires more time to equilibrate. However it also demonstrates easiness and flexibility of the device.

A remark relates to the fate of sulfur initially present in a relatively elevated level of 310 ppm (weight) in this commercial fuel. The presence of $H_2S$ in the reformate 12 indicates that the sulfur is not kept in post-plasma zone, that could deactivate the nickel oxide catalyst filling. It is an important fact which facilitates the use of high sulfur fuels, avoiding the need for prior desulfurization. It is indeed very difficult to desulfurize carbon matter containing many sulfur atoms, while it is simpler to extract only H2S from reformate or from syngas.

The other important remark concerns how to intentionally stop the device at the end of its run in order to prepare for future use. We recommend a quick stop of the device while stopping the flow of fuel followed by cutting of the electric power for the GlidArc-I, followed immediately by the drastic reduction of the air flow (or of other oxidant) until a level of about 2 L(n)/min for every 1 L of volume of the zone post-plasma of the reformer.

So we create a sequential oxidization through all the nickel sub-oxides to NiO and then $Ni_2O_3$, in the filling when its temperature decreases below 600° C.

$$NiO_x + O_2 \rightarrow NiO \rightarrow Ni_2O_3. \tag{18}$$

This process is exothermic. The heat release is controlled by limiting the flow rate of oxidant in order to prevent a sudden rise of temperatures of the successive layers of the filling at the time of such "stratified combustion". Temperatures observed during such an operation can reach 1200° C. without causing any problem to the filling. The peak bed temperature moves slowly in the direction of the combustive flux while leaving behind it the successive layers of nickel oxidized. Once the nickel is fully oxidized the device begins to cool to the ambient temperature.

The restarting of the cooled down device takes between 10 and 30 min to the point of which we are getting a syngas or a reformate suitable to feed for example, an SOFC or a MCFC. Then, about 20 to 60 min of operating the device will be required to reach the optimal reforming and thermal balance of the device, characterized by a stability of temperatures through the filling, cf. the FIG. 3.

The reforming can be stopped also of another way if one wants then to start again it quickly in order to pursue this reforming. In this case, one decreases the fuel flow, then immediately cuts the electric power of the GlidArc-I and decreases very sharply the oxidant flow to match the reaction (1) of total combustion of carbon load. The heat brought by this reaction compensates for the thermal losses of the device and maintains sufficiently high temperature of the post-plasma zone filling while waiting for a restart of reforming mode of operation. In the case of shutdown or standby mode we also observe reactions (10) and (11) that regenerate the filling by complete removal of carbon before the restart of normal operation. It takes then only between 1 and 3 minutes. That is, in the case of a complete stop of the process or "hold" we oxidize traces of carbon or soot (if present, deposited in the device) to CO or $CO_2$ and/or we transform sulfides of nickel (if there are some in the filling) into NiO (or $Ni_2O_3$) and $SO_2$. This short operation of reactivation of the catalytic refractory can be done if necessary periodically, in order to recover the catalytic initial properties of the refractory filling.

Example D

Another C reformer of an interior total volume of 0.6 L is used for the conversion of heavy naphtha. This reactor is, as the previous devices, constructed according to the diagram of the FIG. 2. The reactor contains two electrodes 3 and the dissipated power in the GlidArc-I discharge is equal to 50 W. Only one thermocouple is inserted close to the lateral exit 12 of products where the temperature can reach 780° C. To simplify, we eliminated the porthole and "observed" the discharge 2 by simple electric means. The post-plasma zone 9 has been filled by 0.34 L of activated granules.

The studied liquid is similar to aviation fuels JP8 or Jet A; it is a mixture of aliphatic saturated hydrocarbons and of other alicyclic (naphthalene) C7 to C12, with a content of about 25% of alkyl-aromatic hydrocarbons. The relative molecular mass of this naphtha is roughly 150 (middle value) and its average formula can be written as $CH_{1.94}$. The boiling point of the liquid is between 130° C. and 220° C. and mass density (at ambient temperature) is equal to 780 kg/m³. The range of flow of the naphtha explored was 4.8-11 g/min; no preheating was applied this time to the liquid by reason of its better volatility in relation to Diesel fuel. The studied air flow was between 23 and 42 L(n)/min.

Several tests have been done giving the following results, concentration (% vol., dry basis) of gas components of outgoing reformats:

| | |
|---|---|
| $H_2$ | 15-21 |
| CO | 17-22 |
| $H_2$ + CO | 32-42 |
| $N_2$ + Ar | 53-62 |
| $CO_2$ | 2.9-5.5 |
| $CH_4$ | 1.1-2.7 |
| $C_2H_4$ | 0.1-0.9 |
| $C_2H_6$, $C_2H_2$, $O_2$, $C_3$+ | absent. |

Once again the conversion of the naphtha is total, without any formation of soot or tars. From the measured inlet and exit flow rates and compositions mass and energy balances were obtained for these tests. The thermal power (heat rate) carried by the reformate is then in the range 5-10 kW according quasi-linear to the flow of entering naphtha. Then the power of the Glidarc-1 represents only 1% max.

Example E

Commercial rape oil, with an average chemical formula $C_{18.1}H_{34.1}O_{2.0}$ and density of 913 kg/m3, is converted into syngas (reformate) in our device; this conversion demonstrates the feasibility of using an alternative and renewable fuel. These liquids contain contaminants, which make conventional reforming technologies unsuitable without previous deep purification of such carbonaceous loads in order to avoid the classic catalyst poisoning.

We use here the small C reactor described in example D. External preheating of the oil was used during accumulated 6 hours of testing, without changing any part of the reformer. The air flow is between 35 and 102 L(n)/min and between 10 and 27 g/min for the oil.

Figure 6:
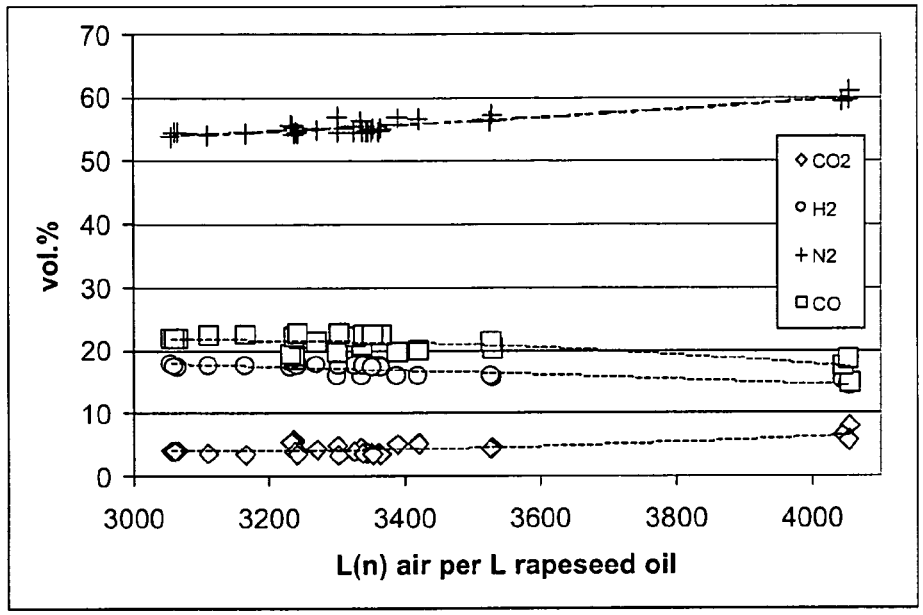

The FIG. 6 represents the main component concentrations (dry basis) in the outgoing gas of the device according to the proportion of the air/oil for all tests. The other gases are in negligible quantity: $CH_4$ 0.5-1.0, $C_2H_4$ 0.1-0.5 and $C_2H_6$ 0.01-0.03% vol.

A precise mass balance based on results of a representative test can be explained by the following reaction:

$$C_{18.1}H_{34.1}O_{2.0} + 10.53\ O_2 =$$

$$= 15.09\ CO + 12.54 H_2 + 2.31\ CO_2 + 0.47\ CH_4 + 0.11\ C_2H_4 + 3.35\ H_2O \tag{19}$$

This reaction indicates that the atomic ratio O/C ra=1.16 is in the optimal range (only using the added oxygen).

Figure 7:
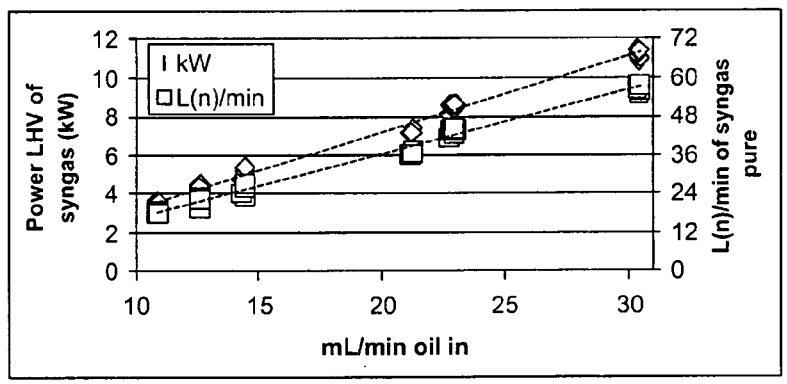
FIG. 7 is a graph depicting the exit flux of the syngas as well as the thermal power corresponding to this flux; and, FIG. 8 is a graph depicting the flux and the thermal power of exiting syngas.

FIG. 7 represent the exit flux of the syngas ($H_2$+CO pure only) in L(n)/min for all tests as well as the thermal power (heat rate) corresponding to this flux.

Example F

This example presents our new process applied to the reforming of the natural gas (NG) taken from the city network. The composition of the NG (in % vol.) done by micro-CG analysis before our tests is the following (percent): 1 $N_2$, 0.5 $CO_2$, 0.1 $C_2H_6$, and 0.05 $C_3H_8$, the remainder being methane. Our tests are done in an A' reactor that is nearly identical to the A. reactor. This A' reactor is shorter and the steel insert previously placed in post-plasma zone is replaced by a larger ceramic tube. It gives the total volume of the reactor equal A' to about 1 L.

Figure 8:
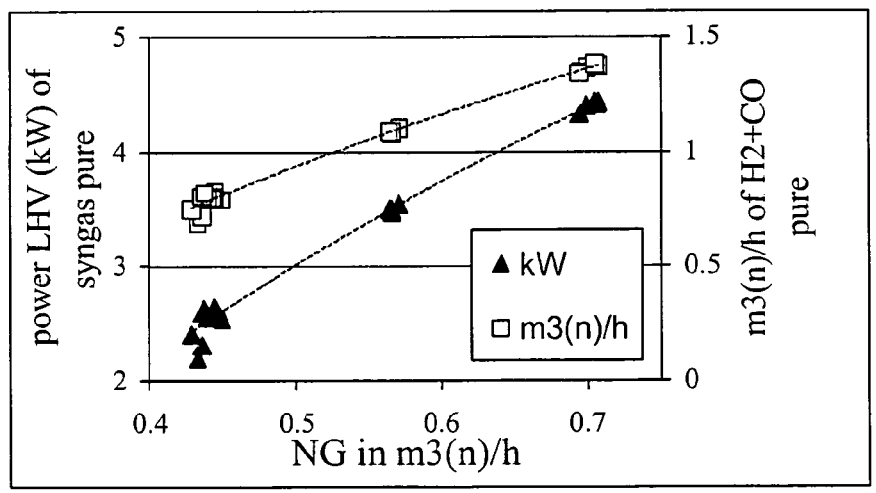

The starting of the reformer is very easy and we get the first out-flow of syngas after only 8 min. The FIG. 8 represent the flux and the thermal power (heat rate) of the exiting syngas ($H_2$+CO only) in m3(n)/h and in kW, respectively. This gas carries between 1 and 3% of methane that is either not converted and/or regenerated following a methanization reaction (17). Anyway, it is not bothersome for the SOFCs or MCFCS that "burn" this molecule $CH_4$ easily. This low content of methane is also acceptable for the Fischer-Tropsches syntheses of synthetic fuels indicating, another potential application of our plasma-catalytic device and our process using this device to transform the natural gases or associated gases in these fuels.

What is claimed is:

1. A catalytic process for converting liquid or gaseous carbonaceous matter into a mixture containing hydrogen $H_2$ and carbon monoxide CO, the mixture accompanied by methane $CH_4$ and ethylene $C_2H_4$, the conversion achieved by a partial oxidization of the carbonaceous matter with oxygen content in an oxidant added to the carbonaceous matter, the process comprising the steps of:
    placing the carbonaceous matter and oxidant in contact with a strong catalytic ceramic refractory for which the melting point exceeds 1250 degrees Celsius, the refractory comprising dispersed nickel that changes between oxidation states under the influence of at least one of temperature and oxygen activity, and wherein the partial oxidization takes place in a temperature range between 600 degrees Celsius and 1000 degrees Celsius.

2. The process of claim 1, wherein the carbonaceous matter is liquid or gaseous, has water or steam initially present or added, and is of a fossil or renewable origin.

3. The process of claim 1, wherein the oxidant containing oxygen, comprises air, air enriched by the oxygen or technical quality oxygen, and the oxidant further comprises steam.

4. A catalytic process for converting liquid or gaseous carbonaceous matter into a mixture containing hydrogen and carbon monoxide, the mixture accompanied by methane and ethylene, the conversion achieved by a partial oxidization of the carbonaceous matter with oxygen content in an oxidant added to the carbonaceous matter, the process comprising the steps of:
    placing the carbonaceous matter and oxidant in contact with a strong catalytic porous ceramic refractory for which the melting point exceeds 1250 degrees Celsius, the refractory comprising dispersed nickel, metallic and oxidized, and wherein the partial oxidization takes place in a temperature between 600 degrees Celsius and 1000 degrees Celsius.

5. A catalytic process for converting liquid or gaseous carbonaceous matter into a mixture containing hydrogen and carbon monoxide, the mixture accompanied by methane and ethylene, the conversion achieved by a partial oxidization of the carbonaceous matter with oxygen content in an oxidant added to the carbonaceous matter, the process comprising the steps of:
    placing the carbonaceous matter and oxidant in contact with a strong catalytic ceramic refractory for which the melting point exceeds 1250 degrees Celsius, the refractory comprising nickel infiltrated within the refractory, and wherein the partial oxidization takes place in a temperature between 600 degrees Celsius and 1000 degrees Celsius.

* * * * *